United States Patent

Koizumi

[11] 4,130,350
[45] Dec. 19, 1978

[54] MEDIUM MAGNIFICATION OBJECTIVE FOR VIDEO DISKS

[75] Inventor: Toshimichi Koizumi, Sagamihara, Japan

[73] Assignee: Olympus Optical Co., Ltd., Tokyo, Japan

[21] Appl. No.: 801,249

[22] Filed: May 27, 1977

[30] Foreign Application Priority Data

May 31, 1976 [JP] Japan .................. 51-63250
Jun. 4, 1976 [JP] Japan .................. 51-65303

[51] Int. Cl.² .................. G02B 9/34; G02B 9/60
[52] U.S. Cl. .................. 350/216; 350/220; 350/175 ML
[58] Field of Search .................. 350/216, 220, 175 ML

[56] References Cited

U.S. PATENT DOCUMENTS 2,206,155 7/1940 Boegehold .................. 350/216
3,879,111 4/1975 Goto .................. 350/216

Primary Examiner—Conrad J. Clark
Attorney, Agent, or Firm—Cushman, Darby & Cushman

[57] ABSTRACT

A medium magnification objective for video disks comprising a first, second, third and fourth lens components in which the first lens component is a negative lens, the second lens component is a positive meniscus lens with its concave surface positioned toward the object, the third lens component consists of one or two positive lenses, the fourth lens component is a negative meniscus lens with its convex surface positioned toward the object, and for which the number of lenses constituting the objective is small, the working distance is large, flatness of image is high and resolving power is also high.

7 Claims, 7 Drawing Figures

MEDIUM MAGNIFICATION OBJECTIVE FOR VIDEO DISKS

BACKGROUND OF THE INVENTION (a) Field of the Invention

The present invention relates to a medium magnification objective for video disks and, more particularly, to a medium magnification objective for reading out the signals recorded on high-density information-recording disks (video disks).

(b) Description of the Prior Art

For objectives to be used in reproducing systems for video disks, it is required to warrant resolving power of $1\mu$ due to the fact that the objective has to read out very small signals recorded with high density. Moreover, the information read out from the disk, which rotates at high speed, contains signals for making the objective follow up the recorded track and signals for automatic focusing in addition to image information. To make the objective read out those information and signals correctly, the flatness of image focused by the objective should be high. To prevent breakage of the video disk and objective which will be caused when the objective contacts the video disk, the working distance of the objective should be long. Besides, to perform automatic focusing, the objective should be compact and light in weight. Moreover, the price of the objective should be low.

As the light used for the objective for video disks is generally a monochromatic light ($\lambda = 632.8$ nm), it is effective for eliminating the noise at the time of amplifying the signals from a detector when transparency for the light of this wavelength is as high as possible. Therefore, to make transparency high, it is necessary to provide multi-layer anti-reflection coating on the lens surface or to make the number of lenses constituting the objective as small as possible. When this problem is considered in connection with the above-mentioned other requirements such as low price and light weight, it is more advantageous when the number of lenses constituting the objective is made as small as possible.

SUMMARY OF THE INVENTION

It is, therefore, a primary object of the present invention to provide a medium magnification objective for video disks for which the working distance is large, flatness of image is high and resolving power is high.

The objective for video disks according to the present invention comprises a first, second, third and fourth lens components. The first lens component is a negative lens, the second lens component is a positive meniscus lens with its concave surface positioned toward the object, the third lens component has positive refractive power, and the fourth lens component is a negative meniscus lens with its convex surface positioned toward the object. Besides, the objective for video disks according to the present invention satisfies the following conditions when reference symbol $r_2$ represents the radius of curvature of the surface on the image side of the first lens component, reference symbol $r_3$ represents the radius of curvature of the surface on the object side of the second lens component, reference symbol $r_{10}$ represents the radius of curvature of the surface on the image side of the fourth lens component, reference symbol $d_2$ represents the airspace between the first and second lens components, reference symbol $d_4$ represents the airspace between the second and third lens components, reference symbol $d_8$ represents the airspace between the third and fourth lens components, reference symbol $f_1$ represents the focal length of the first lens component, reference symbol $f_4$ represents the focal length of the fourth lens component, and reference symbol $f$ represents the focal length of the lens system as a whole.

$$1.0 \leq d_8/(d_2 + d_4) \leq 1.5 \tag{1}$$

$$2.2 \leq r_2/f \leq 3.4 \tag{2}$$

$$0.6 \leq |r_3|/r_2 \leq 0.9 \tag{3}$$

$$0.51 \leq r_{10}/f \leq 0.63 \tag{4}$$

$$2.7 \leq |f_4|/|f_1| \leq 3.7 \tag{5}$$

Now, meaning of the above conditions are described below. If it becomes $d_8/(d_2 + d_4) < 1.0$ in the condition (1), spherical aberration will be overcorrected and the astigmatic difference will be overcorrected. If it becomes $d_8/(d_2 + d_4) > 1.5$, spherical aberration will be undercorrected, the astigmatic difference becomes large and will be undercorrected, and asymmetry of coma will increase.

If is becomes $r_2/f < 2.2$ in the condition (2), the astigmatic difference becomes large and spherical aberration will be overcorrected. If it becomes $r_2/f > 3.4$, spherical aberration will be undercorrected.

If it becomes $|r_3|/r_2 < 0.6$ in the condition (3), the astigmatic difference increases, sagittal rays of astigmatism will be undercorrected, and spherical aberration will tend to be undercorrected. If it becomes $|r_3|/r_2 > 0.9$, meridional rays of astigmatism will be overcorrected, the astigmatic difference becomes large, spherical aberration will be overcorrected, and asymmetry of coma increases.

If it becomes $r_{10}/f < 0.51$ in the condition (4), spherical aberration will be undercorrected. If it becomes $r_{10}/f > 0.63$, spherical aberration will be overcorrected.

If it becomes $|f_4|/|f_1| < 2.7$ in the condition (5), spherical aberration will be undercorrected and asymmetry of coma will be considerably undercorrected. If it becomes $|f_4|/|f_1| > 3.7$, spherical aberration and coma will be overcorrected, the astigmatic difference becomes large, and meridional rays of astigmatism will be undercorrected.

For the lens system according to the present invention described in the above, the third lens component may be arranged as a single biconvex lens as shown in FIG. 1. But, the third lens component may be arranged as two biconvex lenses having a small airspace therebetween as shown in FIG. 3. When the third lens component is arranged as two lenses as above, it is possible to correct curvature of field more favourably. Besides, when the third lens component is arranged as two lenses, it becomes easier to correct aberrations. Therefore, it is possible to make the radii of curvature of surfaces of the fourth lens component comparatively large and, therefore, it becomes easier to manufacture the fourth lens component.

Furthermore, the lens system according to the present invention may be also arranged as shown in FIG. 5 by making the airspace between the two lenses constituting the third lens component large as if those lenses were substantially two different lens components and by varying the focal lengths etc. of respective lens components. Thus, it is possible to obtain a more advanced lens system for which aberrations are corrected more favourably. In the lens system shown in FIG. 5, the third lens component consists of a biconvex lens positioned on the object side and positive meniscus lens arranged to be concave toward the image side and positioned on the image side by leaving a comparatively large airspace between the biconvex lens and positive meniscus lens. Besides, the lens system shown in FIG. 5 is arranged as a more favourable lens system by arranging so that it satisfies the following conditions when reference symbols $r_1$ and $r_2$ respectively represent radii of curvature of respective surfaces of the first lens component, reference symbol $r_{10}$ represents the radius of curvature of the surface on the image side of the fourth lens component, reference symbol $d_2$ represents the airspace between the first and second lens components, reference symbol $f_2$ represents the focal length of the second lens component, reference symbols $f_3$ and $f_4$ respectively represent focal lengths of the two lenses constituting the third lens component, and reference symbol f represents the focal length of the lens system as a whole.

$$3 \leq r_2/f \leq 4.5 \quad (6)$$

$$7 \leq |r_1|/r_{10} \leq 14 \quad (7)$$

$$f_2 \leq f_3 \leq f_4 \quad (8)$$

$$0.2 \leq d_2/f \leq 0.4 \quad (9)$$

Now, meaning of the above conditions are described below.

If it becomes $r_2/f < 3$ in the condition (6), negative refractive power of the first lens component becomes large. Therefore, paraxial rays are diverged largely and spherical aberration tends to be undercorrected. Moreover, diameters of the other lens components become large. If it becomes $r_2/f > 4.5$, the astigmatic difference becomes large and spherical aberration tends to be overcorrected.

If it becomes $|r_1|/r_{10} < 7$ in the condition (7), the radius of curvature of the surface on the object side of the first lens component becomes small, the working distance (the distance from the circumferential portion of the surface on the object side of the first lens component to the object surface) becomes small and asymmetry of coma becomes considerably large. If it becomes $|r_1|/r_{10} > 14$, spherical aberration is overcorrected in the marginal portion of aperture, and it becomes very difficult to manufacture the fourth lens component accurately though it becomes easier to put the exit pupil (or back focal point) to the image side of the fourth lens component.

If it becomes $f_3 < f_2$ in the condition (8), asymmetry of coma becomes large and aberrations as a whole will be unbalanced. If it becomes $f_3 > f_4$, spherical aberration of higher order will be caused considerably and aberrations as a whole will be unbalanced.

If it becomes $d_2/f < 0.2$ in the condition (9), spherical aberration will be somewhat overcorrected and the astigmatic difference becomes large. If it becomes $d_2/f > 0.4$, asymmetry of coma will be caused. Besides, the heights of rays, which come out from the first lens component and enter the second lens component, become large and spherical aberration will be considerably undercorrected.

DETAILED DESCRIPTION OF THE PREFERRED EMBODIMENTS

Figure 1:
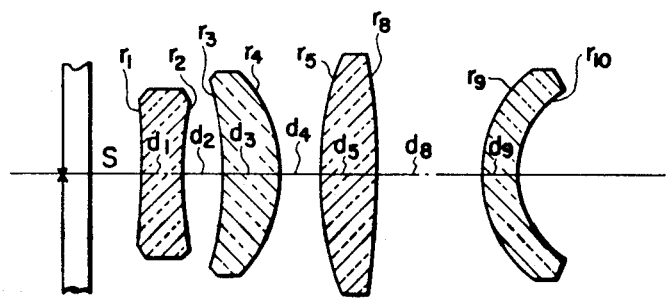
FIG. 1 shows a sectional view of Embodiment 1 of the objective according to the present invention.
Figure 2:
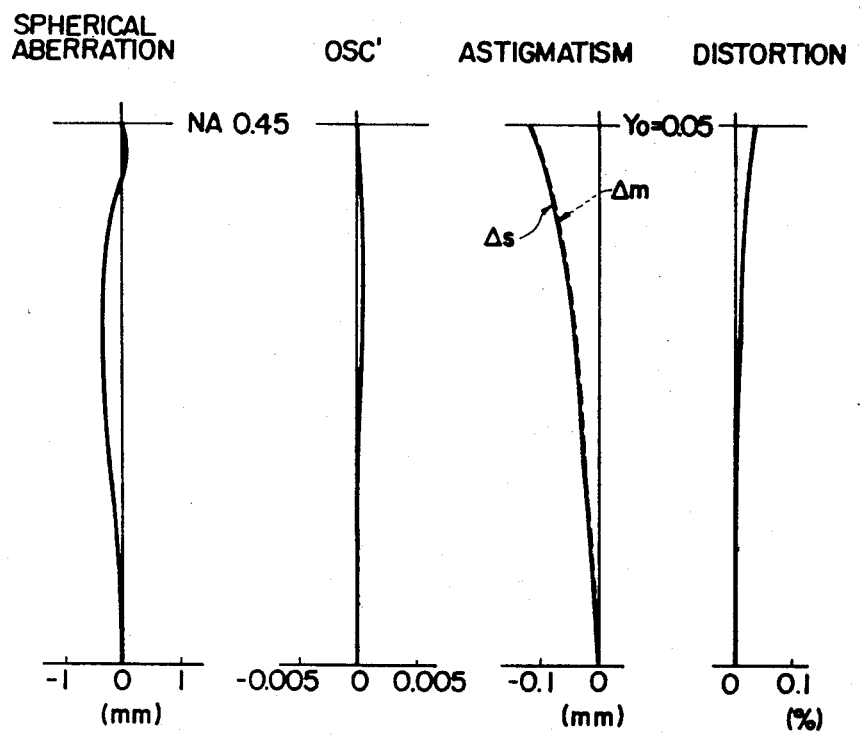
FIG. 2 shows graphs illustrating aberration curves of Embodiment 1.

Preferred embodiments of the medium magnification obejctive for video disks according to the present invention are as shown below.

Embodiment 1
$r_1 = -28.388$
$r_2 = 2.40$    $d_1 = 0.257$    $n_1 = 1.77859$    $\nu_1 = 25.7$
$d_2 = 0.243$
$r_3 = -1.968$
$d_3 = 0.357$    $n_2 = 1.77859$    $\nu_2 = 25.7$
$r_4 = -0.864$
$d_4 = 0.235$
$r_5 = 1.721$
$d_5 = 0.359$    $n_3 = 1.61656$    $\nu_3 = 36.3$
$r_8 = -4.286$
$d_8 = 0.642$
$r_9 = 0.728$
$d_9 = 0.214$    $n_4 = 1.77859$    $\nu_4 = 25.7$
$r_{10} = 0.572$
$\Sigma P = 0.0332$,    $\beta = -20X$,    $f_1 = -2.832$,    $f_4 = -8.614$, $f = 1$
$S = 0.307$ Embodiment 2
$r_1 = -5.207$
$r_2 = 3.11$    $d_1 = 0.253$    $n_1 = 1.77859$    $\nu_1 = 25.7$
$d_2 = 0.284$
$r_3 = -2.026$
$d_3 = 0.39$    $n_2 = 1.77859$    $\nu_2 = 25.7$
$r_4 = -0.944$
$d_4 = 0.138$
$r_5 = 2.285$
$d_5 = 0.369$    $n_3 = 1.61656$    $\nu_3 = 36.3$
$r_6 = 391.567$
$d_6 = 0.063$
$r_7 = 11.51$
$d_7 = 0.148$    $n_4 = 1.61656$    $\nu_4 = 36.3$
$r_8 = -3.39$
$d_8 = 0.506$
$r_9 = 0.807$
$d_9 = 0.36$    $n_5 = 1.77859$    $\nu_5 = 25.7$
$r_{10} = 0.578$
$\Sigma P = 0.0147$,    $\beta = -20X$,    $f_1 = -2.467$,    $f_4 = -8.467$, $f = 1$
$S = 0.333$ Embodiment 3
$r_1 = -8.844$
$r_2 = 3.416$    $d_1 = 0.377$    $n_1 = 1.72309$    $\nu_1 = 28.5$
$d_2 = 0.312$
$r_3 = -5.470$
$d_3 = 0.331$    $n_2 = 1.61656$    $\nu_2 = 36.3$
$r_4 = -0.999$
$d_4 = 0.274$
$r_5 = 5.526$
$d_5 = 0.252$    $n_3 = 1.61656$    $\nu_3 = 36.3$
$r_6 = -2.542$
$d_6 = 0.156$
$r_7 = 1.385$
$d_7 = 0.336$    $n_4 = 1.61656$    $\nu_4 = 36.3$
$r_8 = 3.303$
$d_8 = 0.268$
$r_9 = 1.317$
$d_9 = 0.318$    $n_5 = 1.72309$    $\nu_5 = 28.5$
$r_{10} = 0.712$
$\Sigma P = 0.0315$,    $\beta = -20X$,    $f_2 = 1.927$,    $f_3 = 2.858$
$S = 0.322$                                            $f_4 = 3.623$, $f = 1$ -continued Embodiment 4

| | | | |
|---|---|---|---|
| $r_1 = -8.831$ | | | |
| | $d_1 = 0.385$ | $n_1 = 1.72309$ | $\nu_1 = 28.5$ |
| $r_2 = 4.187$ | | | |
| | $d_2 = 0.31$ | | |
| $r_3 = -5.093$ | | | |
| | $d_3 = 0.328$ | $n_2 = 1.72309$ | $\nu_2 = 28.5$ |
| $r_4 = -1.053$ | | | |
| | $d_4 = 0.351$ | | |
| $r_5 = 8.053$ | | | |
| | $d_5 = 0.257$ | $n_3 = 1.61656$ | $\nu_3 = 36.3$ |
| $r_6 = -2.97$ | | | |
| | $d_6 = 0.03$ | | |
| $r_7 = 1.382$ | | | |
| | $d_7 = 0.336$ | $n_4 = 1.61656$ | $\nu_4 = 36.3$ |
| $r_8 = 3.344$ | | | |
| | $d_8 = 0.334$ | | |
| $r_9 = 1.3$ | | | |
| | $d_9 = 0.307$ | $n_5 = 1.72309$ | $\nu_5 = 28.5$ |
| $r_{10} = 0.725$ | | | |
| $\Sigma P = 0.0315$, | $\beta = -20X$, | $f_2 = 1.774$, | $f_3 = 3.552$ |
| $S = 0.333$ | | $f_4 = 3.585$ | $f = 1$ |

In the above embodiments, reference symbols $r_1, r_2, \ldots$ respectively represent radii of curvature of respective lens surfaces, reference symbols $d_1, d_2, \ldots$ respectively represent thicknesses of respectively lenses and airspaces between respective lenses, reference symbols $n_1, n_2, \ldots$ respectively represent refractive indices of respectively lenses at $\lambda = 632.8$ nm, reference symbols $\nu_1, \nu_2, \ldots$ respectively represent Abbe's numbers of respective lenses for d-line, reference symbol $\Sigma P$ represents Petzval's sum, reference symbol $\beta$ represents magnification and reference symbol $S$ represents the working distance of the lens system.

Figure 3:
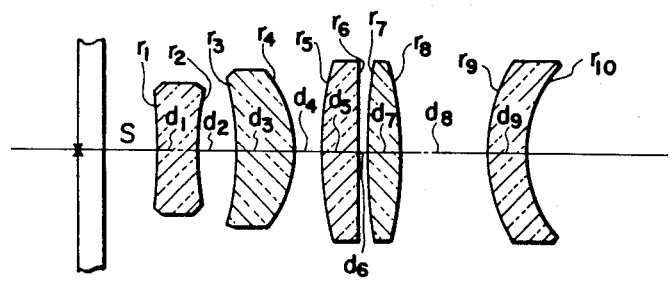
FIG. 3 shows a sectional view of Embodiment 2.
Figure 4:
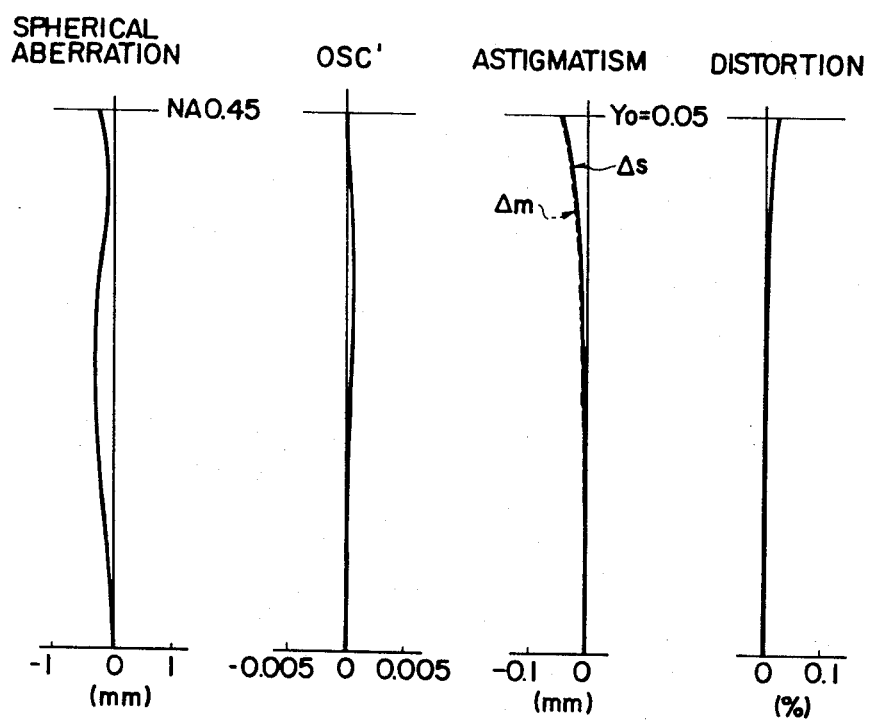
FIG. 4 shows graphs illustrating aberration curves of Embodiment 2.
Figure 5:
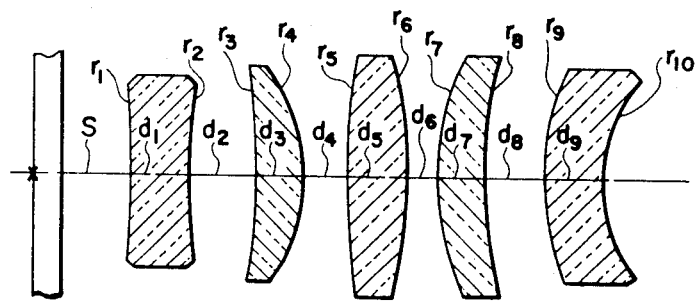
FIG. 5 shows a sectional view of Embodiments 3 and 4.
Figure 6:
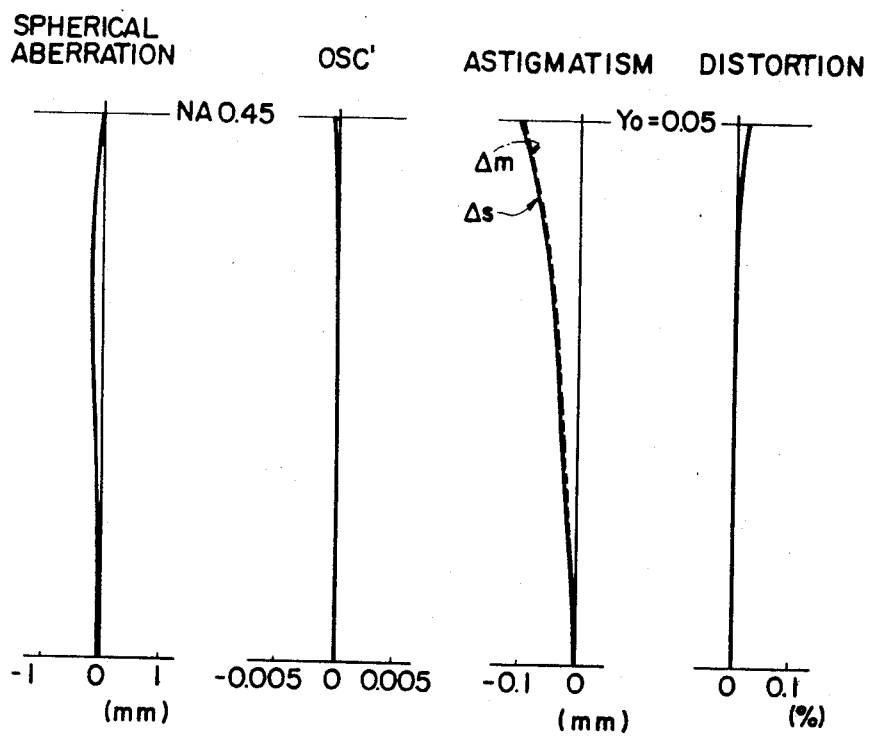
FIG. 6 shows graphs illustrating aberration curves of Embodiment 3.
Figure 7:
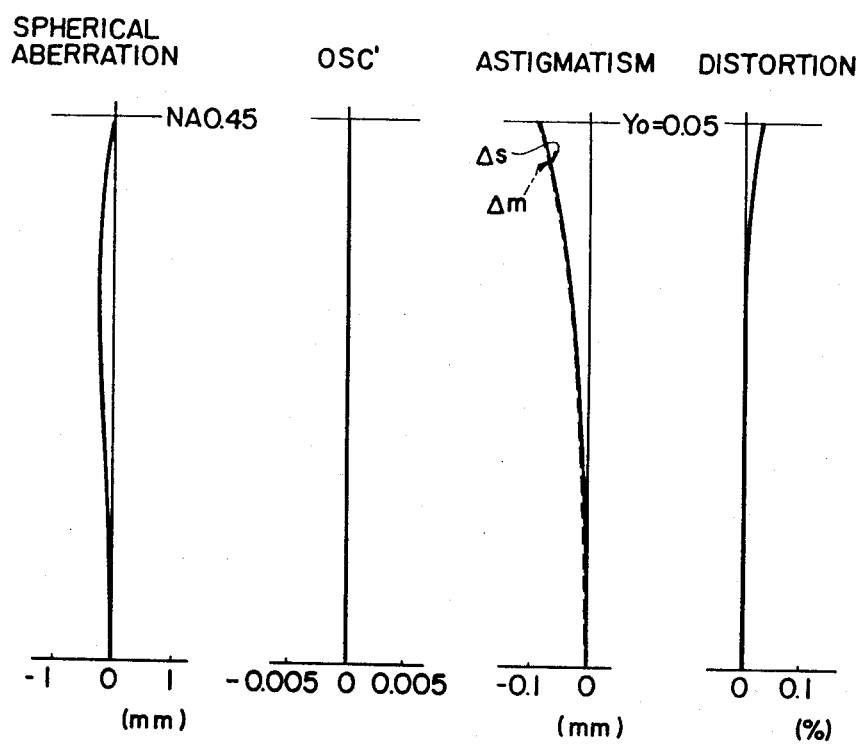
FIG. 7 shows graphs illustrating aberration curves of Embodiment 4.

Out of the above embodiments, Embodiment 1 has lens configuration as shown in FIG. 1, Embodiment 2 has lens configuration as shown in FIG. 3 and Embodiments 3 and 4 have lens configuration as shown in FIG. 5. As it is evident from figures, the third lens component of Embodiment 1 consists of a biconvex lens and the third lens components of Embodiments 2, 3 and 4 respectively consist of two positive lenses.

Besides, in the objective according to the present invention, materials of high refractive indices, i.e., $n\lambda \geq 1.6$ are used for respective lenses so that respective lenses can be manufactured easily and spherical aberration to be caused at respective lens surfaces is made extremely small.

In the above embodiments, reference symbols for respective lens surfaces and for thicknesses of respective lenses and airspaces between respective lenses are given based on the embodiment shown in FIG. 3. Therefore, as the embodiment shown in FIG. 1 comprises a smaller number of lenses compared with the embodiment shown in FIG. 3, reference symbols $r_6$, $r_7$, $d_6$ and $d_7$ are not given to it.

I claim:

1. A medium magnification objective for video disks comprising a first, second, third and fourth lens components, said first lens component being a negative lens, said second lens component being a positive meniscus lens with its concave surface positioned toward the object side, said third lens component having positive refractive power, said fourth lens component being a negative meniscus lens with its convex surface positioned toward the object side, said medium magnification objective for video disks satisfying the following conditions:

$$1.0 \leq d_8/(d_2 + d_4) \leq 1.5 \quad (1)$$

$$2.2 \leq r_2/f \leq 3.4 \quad (2)$$

$$0.6 \leq |r_3|/r_2 \leq 0.9 \quad (3)$$

$$0.51 \leq r_{10}/f \leq 0.63 \quad (4)$$

$$2.7 \leq |f_4|/|f_1| \leq 3.7 \quad (5)$$

wherein reference symbol $r_2$ represents the radius of curvature of the surface on the image side of the first lens component, reference symbol $r_3$ represents the radius of curvature of the surface on the object side of the second lens component, reference symbol $r_{10}$ represents the radius of curvature of the surface on the image side of the fourth lens component, reference symbol $d_2$ represents the airspace between the first and second lens components, reference symbol $d_4$ represents the airspace between the second and third lens components, reference symbol $d_8$ represents the airspace between the third and fourth lens components, reference symbol $f_1$ represents the focal length of the first lens components, reference symbol $f_4$ represents the focal length of the fourth lens component and reference symbol $f$ represents the focal length of the lens system as a whole.

2. A medium magnification objective for video disks according to claim 1, in which said medium magnification objective for video disks has the following numerical data:

| | | | |
|---|---|---|---|
| $r_1 = -28.388$ | | | |
| | $d_1 = 0.257$ | $n_1 = 1.77859$ | $\nu_1 = 25.7$ |
| $r_2 = 2.40$ | | | |
| | $d_2 = 0.243$ | | |
| $r_3 = -1.968$ | | | |
| | $d_3 = 0.357$ | $n_2 = 1.77859$ | $\nu_2 = 25.7$ |
| $r_4 = -0.864$ | | | |
| | $d_4 = 0.235$ | | |
| $r_5 = 1.721$ | | | |
| | $d_5 = 0.359$ | $n_3 = 1.61656$ | $\nu_3 = 36.3$ |
| $r_8 = -4.286$ | | | |
| | $d_8 = 0.642$ | | |
| $r_9 = 0.728$ | | | |
| | $d_9 = 0.214$ | $n_4 = 1.77859$ | $\nu_4 = 25.7$ |
| $r_{10} = 0.572$ | | | |
| $\Sigma P = 0.0332$, | $\beta = -20X$, | $f_1 = -2.832$, | $f_4 = -8.614, f = 1$ |
| $S = 0.307$ | | | | wherein reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses at $\lambda = 632.8$ nm, reference symbols $\nu_1, \nu_2, \ldots$ respectively represent Abbe's numbers of respective lenses for d-line, reference symbol $\Sigma P$ represents Petzval's sum, reference symbol $\beta$ represents magnification, reference symbol $f_1$ represents the focal length of the first lens component, reference symbol $f_4$ represents the focal length of the fourth lens component, reference symbol $f$ represents the focal length of the lens system as a whole and reference symbol $S$ represents the working distance of the lens system.

3. A medium magnification objective for video disks according to claim 1, in which said third lens component consists of two positive lenses having a small airspace therebetween.

4. A medium magnification objective for video disks according to claim 3, in which said medium magnification objective for video disks has the following numerical data:

| $r_1 = -5.207$ | | | |
|---|---|---|---|
| $r_2 = 3.11$ | $d_1 = 0.253$ | $n_1 = 1.77859$ | $\nu_1 = 25.7$ |
| $r_3 = -2.026$ | $d_2 = 0.284$ | | |
| $r_4 = -0.944$ | $d_3 = 0.39$ | $n_2 = 1.77859$ | $\nu_2 = 25.7$ |
| $r_5 = 2.285$ | $d_4 = 0.138$ | | |
| $r_6 = 391.567$ | $d_5 = 0.369$ | $n_3 = 1.61656$ | $\nu_3 = 36.3$ |
| $r_7 = 11.51$ | $d_6 = 0.063$ | | |
| $r_8 = -3.39$ | $d_7 = 0.148$ | $n_4 = 1.61656$ | $\nu_4 = 36.3$ |
| $r_9 = 0.807$ | $d_8 = 0.506$ | | |
| $r_{10} = 0.578$ | $d_9 = 0.36$ | $n_5 = 1.77859$ | $\nu_5 = 25.7$ |
| $\Sigma P = 0.0147$, $S = 0.333$ | $\beta = -20X$, | $f_1 = -2.467$, | $f_4 = -8.467$, $f = 1$ | wherein reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses at $\lambda = 632.8$ nm, reference symbols $\nu_1, \nu_2, \ldots$ respectively represent Abbe's numbers of respective lenses for d-line, reference symbol $\Sigma P$ represents Petzval's sum, reference symbol $\beta$ represents magnification, reference symbol $f_1$ represents the focal length of the first lens component, reference symbol $f_4$ represents the focal length of the fourth lens component, reference symbol $f$ represents the focal length of the lens system as a whole and reference symbol S represents the working distance of the lens system.

5. A medium magnification objective for video disks comprising a first, second, third and fourth lens components, said first lens component being a negative lens, said second lens component being a positive meniscus lens with its concave surface positioned toward the object side, said third lens component consisting of a biconvex lens and positive meniscus lens with its convex surface positioned toward the object side, said fourth lens component being a negative meniscus lens with its convex surface positioned toward the object side, said medium magnification objective for video disks satisfying the following conditions:

$$3 \leq r_2/f \leq 4.5 \quad (6)$$

$$7 \leq |r_1|/r_{10} \leq 14 \quad (7)$$

$$f_2 \leq f_3 \leq f_4 \quad (8)$$

$$0.2 \leq d_2/f \leq 0.4 \quad (9)$$

wherein reference symbols $r_1$ and $r_2$ respectively represent radii of curvature of respective surfaces of the first lens component, reference symbol $r_{10}$ represents the radius of curvature of the surface on the image side of the fourth lens component, reference symbol $d_2$ represents the airspace between the first and second lens components, reference symbol $f_2$ represents the focal length of the second lens component, reference symbols $f_3$ and $f_4$ respectively represent the focal lengths of respective lenses constituting the third lens component and reference symbol $f$ represents the focal length of the lens system as a whole.

6. A medium magnification objective for video disks according to claim 5, in which said medium magnification objective for video disks has the following numerical data:

| $r_1 = -8.844$ | | | |
|---|---|---|---|
| $r_2 = 3.416$ | $d_1 = 0.377$ | $n_1 = 1.72309$ | $\nu_1 = 28.5$ |
| $r_3 = -5.470$ | $d_2 = 0.312$ | | |
| $r_4 = -0.999$ | $d_3 = 0.331$ | $n_2 = 1.61656$ | $\nu_2 = 36.3$ |
| $r_5 = 5.526$ | $d_4 = 0.274$ | | |
| $r_6 = -2.542$ | $d_5 = 0.252$ | $n_3 = 1.61656$ | $\nu_3 = 36.3$ |
| $r_7 = 1.385$ | $d_6 = 0.156$ | | |
| $r_8 = 3.303$ | $d_7 = 0.336$ | $n_4 = 1.61656$ | $\nu_4 = 36.3$ |
| $r_9 = 1.317$ | $d_8 = 0.268$ | | |
| $r_{10} = 0.712$ | $d_9 = 0.318$ | $n_5 = 1.72309$ | $\nu_5 = 28.5$ |
| $\Sigma P = 0.0316$, $S = 0.322$ | $\beta = -20X$, | $f_2 = 1.927$, $f_4 = 3.623$, | $f_3 = 2.858$ $f = 1$ | wherein reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses at $\lambda = 632.8$ nm, reference symbols $\nu_1, \nu_2, \ldots$ respectively represent Abbe's numbers of respective lenses for d-line, reference symbol $\Sigma P$ represents Petzval's sum, reference symbol $\beta$ represents magnification, reference symbol $f_2$ represents the focal length of the second lens component, reference symbols $f_3$ and $f_4$ respectively represent the focal lengths of respective lenses constituting the third lens component, reference symbol $f$ represents the focal length of the lens system as a whole and reference symbol S represents the working distance of the lens system.

7. A medium magnification objective for video disks according to claim 5, in which said medium magnification objective for video disks has the following numerical data:

| $r_1 = -8.831$ | | | |
|---|---|---|---|
| $r_2 = 4.187$ | $d_1 = 0.385$ | $n_1 = 1.72309$ | $\nu_1 = 28.5$ |
| $r_3 = -5.093$ | $d_2 = 0.31$ | | |
| $r_4 = -1.053$ | $d_3 = 0.328$ | $n_2 = 1.72309$ | $\nu_2 = 28.5$ |
| $r_5 = 8.053$ | $d_4 = 0.351$ | | |
| $r_6 = -2.97$ | $d_5 = 0.257$ | $n_3 = 1.61656$ | $\nu_3 = 36.3$ |
| $r_7 = 1.382$ | $d_6 = 0.03$ | | |
| $r_8 = 3.344$ | $d_7 = 0.336$ | $n_4 = 1.61656$ | $\nu_4 = 36.3$ |
| $r_9 = 1.3$ | $d_8 = 0.334$ | | |
| $r_{10} = 0.725$ | $d_9 = 0.307$ | $n_5 = 1.72309$ | $\nu_5 = 28.5$ |
| $\Sigma P = 0.0315$, $S = 0.333$ | $\beta = -20X$, | $f_2 = 1.774$, $f_4 = 3.585$, | $f_3 = 3.552$ $f = 1$ | wherein reference symbols $r_1, r_2, \ldots$ respectively represent radii of curvature of respective lens surfaces, reference symbols $d_1, d_2, \ldots$ respectively represent thicknesses of respective lenses and airspaces between respectively lenses, reference symbols $n_1, n_2, \ldots$ respectively represent refractive indices of respective lenses at $\lambda = 632.8$ nm, reference symbols $\nu_1, \nu_2, \ldots$ respectively represent Abbe's numbers of respective lenses for d-line, reference symbol $\Sigma P$ represents Petzval's sum, reference symbol β represents magnification, reference symbol $f_2$ represents the focal length of the second lens component, reference symbols $f_3$ and $f_4$ respectively represent the focal lengths of respective lenses constituting the third lens component, reference symbol f represents the focal length of the lens system as a whole and reference symbol S represents the working distance of the lens system.

* * * * *